3,264,809
RAKE AND COLLECTOR DEVICE
Avery L. Jackson, Rte. 1, Boone, N.C.
Filed Dec. 8, 1964, Ser. No. 416,757
7 Claims. (Cl. 56—400.12)

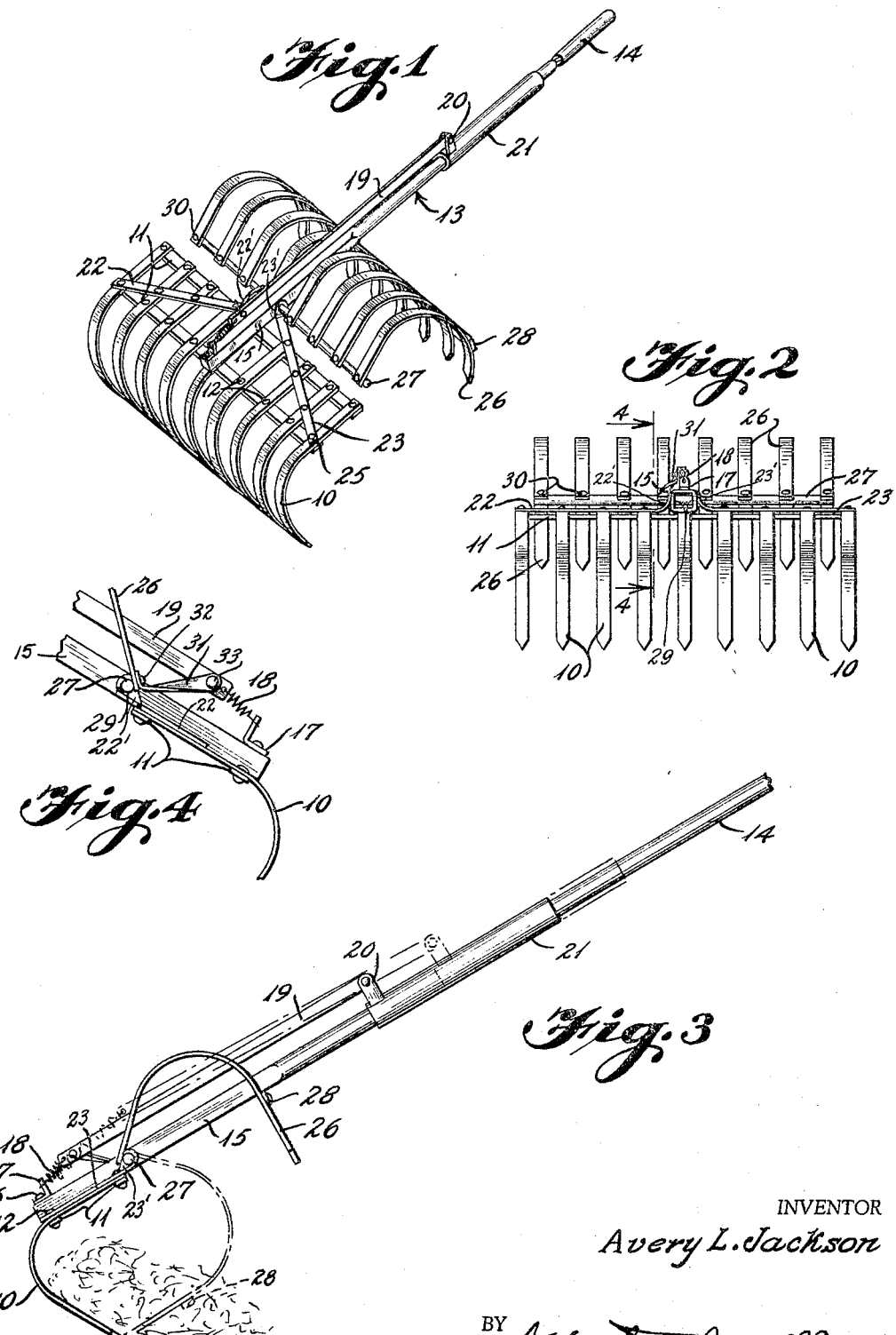

This invention relates to the movement of objects of various kinds together in order that they may be collected and removed in a group and also relates to apparatus and equipment by which such collection and removal can be accomplished.

The invention relates particularly to a rake for the collection and removal of leaves and debris by means of which after raking parts of the same can be moved toward each other to retain the material raked together in condition for the elevation and removal of the same.

Prior devices have included hand rakes which also could be used as scoops to collect cut glass, leaves, trash or waste; however, these devices have not been fully satisfactory due to the fact that they were flimsy, could not be used to perform the desired task thoroughly and satisfactorily, as well as for other reasons.

It is an object of the invention to provide a practical durable rake and collector or scoop of simple substantial and durable construction, which includes a handle with a fixed rake and a rake movable relative to the fixed rake to contain raked matter therebetween.

Another object of the invention is to provide a combination rake and container with a movable jaw and a handle, with simple means for actuating the movable jaw to contain matter between the jaws to make it possible to toss or move the contents to a nearby location or to transport the same to a more remote location, as well as a device of the character indicated which can be readily handled and used for the purpose indicated.

Another object of the invention is to provide a rake of the character indicated.

Other objects and advantages of the invention will be apparent from the following description taken in conjunction with the accompanying drawing wherein:

FIG. 1 is a perspective illustrating one embodiment of the invention;

FIG. 2, an end elevation;

FIG. 3, an enlarged side elevation of the device in use and in dot-dash lines in the position of the parts for containing and picking up leaves or the like; and FIG. 4, a fragmentary enlarged view taken on the line 4—4 of FIG. 2.

Briefly stated, the invention comprises generally parallel fixed and movable rake members attached to a handle. On the handle is an operating member connected through linkage to the movable rake member with springs for maintaining the movable rake in an elevated position so that it will not interfere with the use of the fixed rake. The rakes are constructed so that any part that is damaged in use can be replaced, and the movable rake is slightly shorter than the fixed rake with its ends spaced inwardly from the ends of the fixed rake.

With continued reference to the drawing, the rake and collection device of the present invention includes a series of tines 10 detachably connected and maintained in spaced parallel relation to each other by means of a pair of generally parallel bars 11 to form a fixed rake head. Fasteners in the form of screws, or bolts and nuts 12, are utilized for fastening the tines to the bars in order that a broken, bent or mutilated tine may readily be replaced.

The rake is provided with a handle 13, which may be hollow as shown, having a round gripping portion 14 and a square portion 15 adjacent its opposite or rake head end. The handle is fastened at right angles to the bars 11 to which the tines 10 that extend outwardly from one side of the handle are connected by means of bolts and nuts 16. To the bolt and nut 16 nearest the end of the handle 13 a bracket 17 is fastened for attachment of a spring 18 which connects to an actuating link 19 secured by means of a pivot pin to a pair of lugs 20 on the lower end of an operating sleeve 21 slidably mounted on the round portion 14 of the handle.

Diagonally extending braces 22 and 23 as shown in FIG. 1 overlie the parallel bars 11, extending transversely of the handle 13, and are secured to each of the tines 10 by means of fasteners, such as nuts and bolts 25, to rigidify and strengthen the tines by interconnecting them together. The inner ends of the braces 22 and 23 are bent upwardly into alignment with each other and in contacting relation with opposite sides of the squared section 15 of the handle, as shown in FIGS. 2–4, for a purpose to be presently described.

In order to provide means for picking up and carrying material raked, an auxiliary or movable rake head is provided composed of tines 26 fixedly connected to bars 27 and 28 with the bar 28 disposed relatively close to the free ends of the tines 10 at the same side of the handle 13, as shown in FIGS. 1 and 3. The bar 27, which is of round section, extends through and is pivotally supported in aligned apertures 29 in the square portion 15 of the handle and in aligned openings 22' and 23' in the bent-up portions of the braces 22 and 23, respectively, to provide for the partial rotation or oscillation of the shaft 27 and the tines 26 carried thereby. The tines are secured to the bars 27 and 28 by fasteners such as bolts and nuts 30. The rotary bar 27 is located in generally parallel relation to the bars 11 and above the attached ends of the tines 10 of the stationary rake head and consequently when the bar 27 is oscillated so that the free ends of the tines 26 are moved towards the tines 10, a cage or enclosure will thereby be provided as illustrated in FIG. 3. As clearly shown in FIG. 3 the pivoted tines 26 are longer and of a greater radius of curvature than are fixed tines 10. Accordingly, when moved to their closed position adjacent tines 10, as indicated in dot-dash lines, the tines 26 will engage with and support a greater proportion of raked material confined in the enclosure formed by the two sets of tines. The bar 28 not only aids in preventing the dropping out of the enclosure of raked material from between the tines, it also acts as a means to equalize or distribute the loading between the tines. In addition the bar 28 acts as an abutment means, as illustrated, to limit upward pivotal movement of the tines 26 relative to the rake handle.

In order to move the second group of tines 26 towards the fixed first group 10 a lever 31 is rigidly fastened by a bolt and nut 32 with the rotatable bar 27 and its opposite end is connected by a pivot 33 with the actuating link 19. Thus upon retraction of link 19 the bar 27 will be rotated sufficiently to bring the tines 26 into opposed and cooperating or caging relation to the tines 10, the movement of the link member 19 being occasioned by the manual sliding of the sleeve 21 on the handle 14 toward its grip portion 14 thereby tensioning spring 18. When sleeve 21 is manually released the tensioned spring 18 automatically returns the tines 26 through approximately 90 degrees to their inoperative and uppermost position (FIGS. 1 and 3) as determined by the abutment of bar 28 against the underside of the handle 13 wherein the major portion of the curved section of the tines extend above the handle.

It will be apparent from the foregoing that a simple, practical, reliable and durable construction is provided which can be used for raking leaves, grass, debris or other things and, when desired, by merely manually sliding of the sleeve 21 on the handle 14, the movable rake head can be brought into position to form a cage for holding the raked and collected material between the opposed fixed and movable rake head portions of the device and for picking up and supporting such collected material.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A combination rake and collector device for use with leaves, trash or the like comprising,
   an elongated handle,
   a rake head having bar means fixedly mounting said rake head on one end of said handle to extend symmetrically at right angles thereto,
   said rake head including a set of substantially parallel and generally arcuately curved tines fixedly mounted at their upper end portions on said bar means so as to extend outwardly at one side of said handle and in facing relation toward the opposite end of the latter,
   said handle including aperture means therein rotatably mounting a bar at right angles thereto and generally parallel to and adjacent said bar means,
   brace means secured to and rigidifying said first set of tines,
   said brace means including portions adjacent said handle providing additional bearing support for said rotatably mounted bar,
   a second set of substantially parallel and generally arcuately curved tines fixedly secured on said rotatably mounted bar to rotate therewith at said one side of said handle through an angle of approximately 90 degrees,
   said second set of tines being of greater length and of a greater radius of curvature than said first set of tines,
   means for rotating said second set of bar-mounted tines downwardly into a generally parallel and cooperative caging position abreast of said first set of tines,
   and spring means normally yieldably positioning said second set of tines upwardly to an inoperative position adjacent said handle.

2. A rake and collector device as defined in claim 1 wherein said one end of said handle is of rectangular cross-section,
   said aperture means extending transversely through said rectangular handle section intermediate the opposite side thereof,
   said brace means being secured to and rigidifying said first set of tines and having angular end portions disposed in aligned abutting relation to said handle at each side thereof and in surrounding relation to said aperture means therein to thereby provide additionally bearing support of said rotatably mounted bar.

3. A rake and collector device as defined in claim 2 wherein said aperture means in said handle mounting said bar is offset relative to the mounting of said first set of tines on said handle whereby when said second set of tines are actuated downwardly into their lowermost position with the outer free ends thereof being positioned adjacent the lower ends of said first set of tines to form an elongated enclosure therewith, said second set of tines will encompass and support the weight of an appreciably greater portion of the raked material when confined in said elongated enclosure,
   said means for rotating said second set of bar-mounted tines downwardly and including lever means extending from said bar-mounted tines upwardly to the opposite side of said elongated handle.

4. A combination rake and collector device for use with leaves, trash or the like comprising,
   an elongated hollow handle,
   a rake head having bar members fixedly mounting said rake head on one end of said handle to extend symmetrically at right angles thereto,
   said rake head including a set of substantially parallel and generally arcuately curved tines fixedly mounted at their upper end portions on said bar members so as to extend outwardly at one side of said handle and in facing relation toward the opposite end of the latter,
   said handle including aperture means therein rotatably mounting a bar of round section therein at right angles thereto and generally parallel to and adjacent one of said bar members,
   a second set of substantially parallel and generally arcuately curved tines fixedly secured on said rotatably mounted bar to rotate therewith at said one side of said handle through an angle of approximately 90 degrees,
   said second set of tines being of greater length and of a greater radius of curvature than said first set of tines,
   manually operable means for rotating said second set of bar-mounted tines downwardly into a generally parallel and cooperative caging position abreast of said first set of tines,
   spring means normally yieldably positioning said second set of tines upwardly in an inoperative position adjacent said handle,
   a portion of the curve of said second set of tines extending above said rotatably mounted bar when in said inoperative position,
   said aperture means in said handle mounting said bar of round section being offset relative to the mounting of said first set of tines on said handle whereby when said second set of tines are actuated by said manually operable means to its lowermost position against the action of said spring means with the outer free ends of the second set of tines positioned adjacent the lower ends of said first set of tines they form an elongated enclosure therewith whereby said second set of tines will encompass and support the weight of an appreciably greater portion of the raked material when confined in said elongated enclosure.

5. A rake and collector device as defined in claim 4 and including a second bar member extending transversely of and rigidly securing said second set of tines together,
   said second bar member being positioned relatively close to the lower free ends of said second set of tines to distribute the weight of raked material within the elongated enclosure and carried by said second set of tines between the tines thereof,
   said second bar member comprising abutment means engageable wtih said handle to limit upward movement of said second set of tines to their inoperative position under the action of said spring means.

6. A rake and collector device as defined in claim 1 wherein
   said one end of said handle is of square cross-section and the remainder thereof includes a portion of round section,
   said means for rotating said second set of bar-mounted tines downwardly comprising a lever fixed to said rotatable bar to extend to the opposite side of said handle member relative to said one side thereof,
   a manually operable sleeve member slidably mounted on said portion of the elongated handle of round section,
   and an operating link extending generally parallel to and overlying said opposite side of said elongated handle and pivotally connecting said lever and said manually operable sleeve member,
   said spring means being positioned at said opposite side of said handle and connected between said handle and said lever.

7. A rake and collector device as defined in claim 1 wherein
a reinforcing member extends transversely between and is secured to each of the tines of said second set at a location nearer the free ends thereof than said bar rotatably mounting them,
said reinforcing member constituting abutment means for limiting upward movement of said second set of tines to their inoperative position wherein a major portion of said second set of curved tines extends above said handle.

References Cited by the Examiner

UNITED STATES PATENTS

| | | | |
|---|---|---|---|
| 828,646 | 8/1906 | Frederick | 56—400.12 |
| 2,504,943 | 4/1950 | Zifferer | 56/400.12 |

ANTONIO F. GUIDA, *Acting Primary Examiner.*